United States Patent
DeAscanis et al.

(10) Patent No.: US 9,618,424 B2
(45) Date of Patent: Apr. 11, 2017

(54) GAS TURBINE INSPECTION APPARATUS AND METHOD AND SYSTEM FOR INSPECTING A GAS TURBINE

(71) Applicant: Siemens Energy, Inc., Orlando, FL (US)

(72) Inventors: Joshua DeAscanis, Oviedo, FL (US); Clifford Hatcher, Jr., Orlando, FL (US); James P. Williams, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 314 days.

(21) Appl. No.: 14/335,043

(22) Filed: Jul. 18, 2014

(65) Prior Publication Data

US 2016/0018292 A1    Jan. 21, 2016

(51) Int. Cl.
*G01M 15/14* (2006.01)
*G01M 15/02* (2006.01)

(52) U.S. Cl.
CPC ............ *G01M 15/14* (2013.01); *G01M 15/02* (2013.01)

(58) Field of Classification Search
CPC .. F01D 21/003; G01N 21/954; G01N 27/902; G02B 23/2484; G01M 15/02; G01M 15/14
USPC ...................................................... 73/112.01
See application file for complete search history.

(56) References Cited

U.S. PATENT DOCUMENTS

| | | | | |
|---|---|---|---|---|
| 6,792,809 B1* | 9/2004 | Moore | ................ | F01D 25/285 73/583 |
| 7,421,915 B2* | 9/2008 | Yamane | .............. | G01M 5/0025 73/865.8 |
| 7,861,579 B2* | 1/2011 | Mainville | ............... | F01D 17/02 73/112.01 |
| 7,950,297 B2* | 5/2011 | Moore | ................. | G01N 27/902 73/660 |
| 8,299,785 B2* | 10/2012 | Bousquet | ........... | G01N 27/9033 324/220 |
| 9,057,710 B2* | 6/2015 | Hatcher | ............. | G02B 23/2476 |
| 9,116,071 B2* | 8/2015 | Hatcher, Jr. | ......... | G02B 23/2484 |
| 9,145,791 B2* | 9/2015 | Yoon | ..................... | F01D 21/003 |
| 9,154,743 B2* | 10/2015 | Hatcher, Jr. | ......... | G02B 23/2484 |
| 2006/0017434 A1* | 1/2006 | Tenley | ............... | G01N 27/9013 324/238 |
| 2007/0223643 A1* | 9/2007 | Yamane | .............. | G01M 5/0025 376/249 |
| 2012/0281084 A1* | 11/2012 | Hatcher | .................. | F01D 9/023 348/83 |
| 2013/0192353 A1 | 8/2013 | Hatcher | | |

(Continued)

Primary Examiner — Freddie Kirkland, III

(57) ABSTRACT

A method and a system for inspection of gas turbine are presented. An inspection tool is attached on a track which is permanently positioned on site with respect to the gas turbine. The inspection tool includes an extendible shaft with a proximal end attached on the track and a distal end carrying a sensor. The inspection tool moves along the track for accessing an inspection port of the gas turbine by the shaft. A control system is coupled to the inspection tool for controlling the inspection tool for the inspection of the gas turbine. The method and system enable an automated engine inspection which allows for the engine to have been inspected and reviewed by an engineer without having to send the engineer on site.

18 Claims, 6 Drawing Sheets

(56) References Cited

U.S. PATENT DOCUMENTS

2016/0011080 A1* 1/2016 Moore .................. F01D 25/285
73/112.01

* cited by examiner

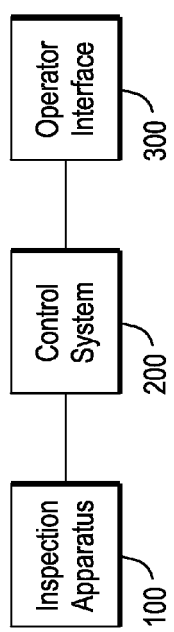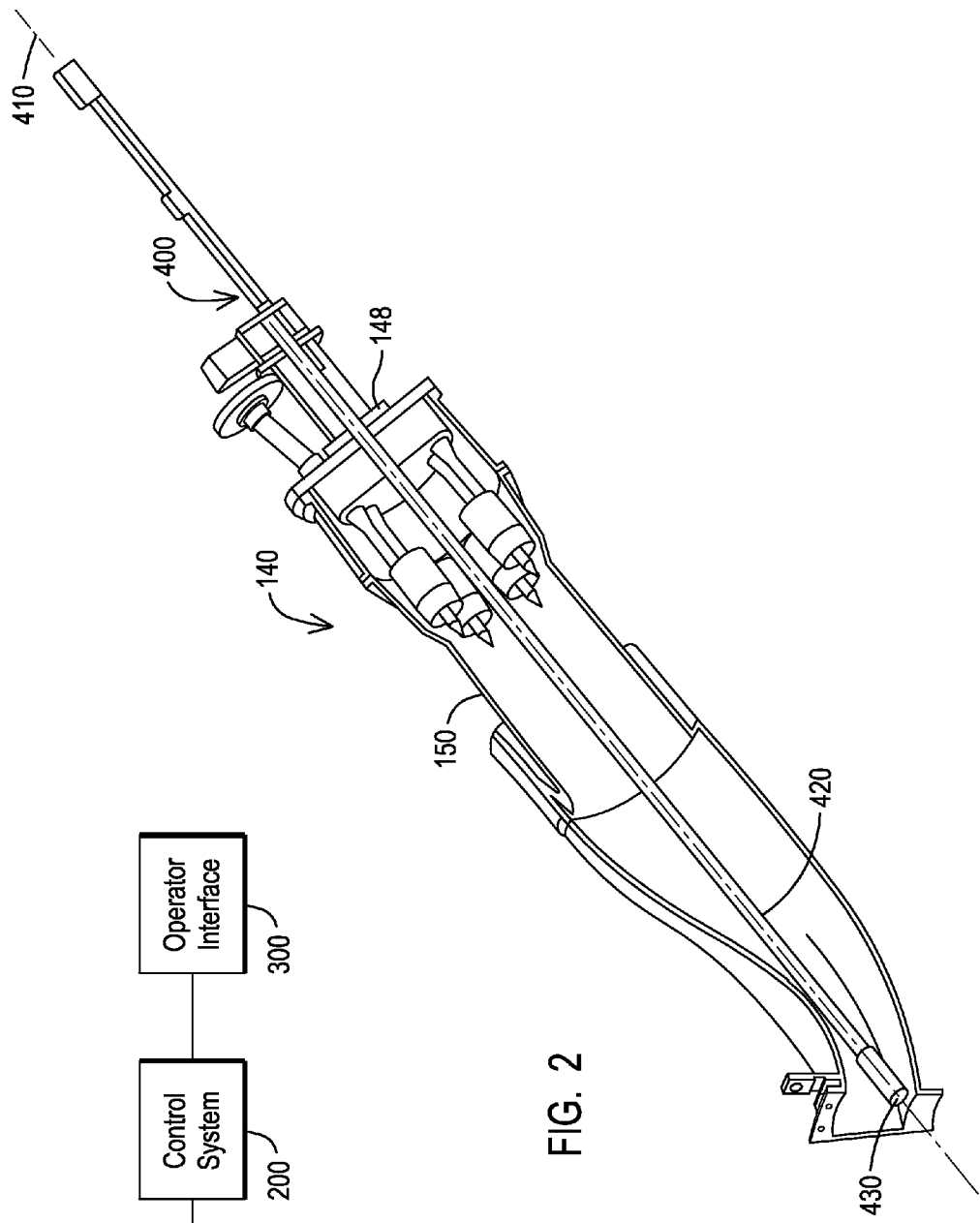

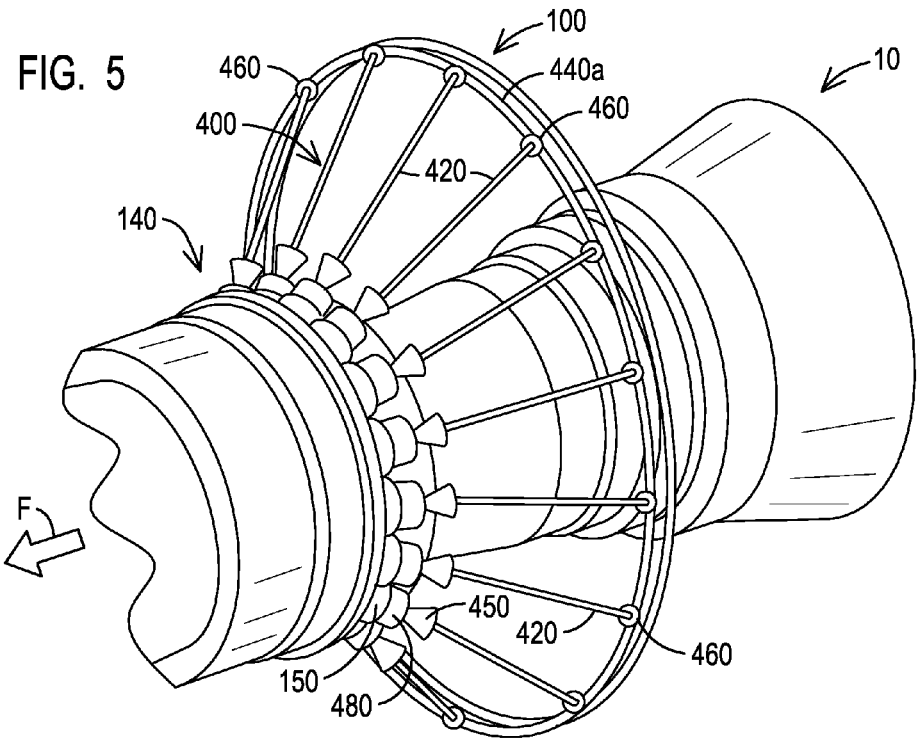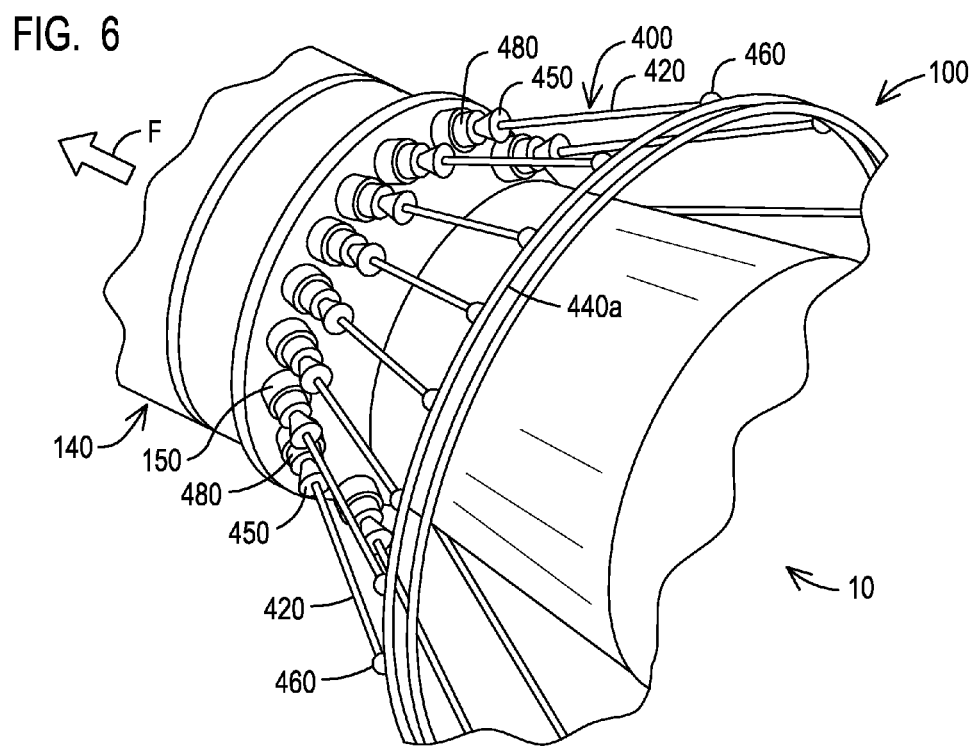

GAS TURBINE INSPECTION APPARATUS AND METHOD AND SYSTEM FOR INSPECTING A GAS TURBINE

FIELD

Aspects of the present invention relate to inspection of a gas turbine and a gas turbine inspection apparatus.

DESCRIPTION OF RELATED ART

Power generation machinery, such as steam or gas industrial turbines, are often operated continuously with scheduled inspection and maintenance periods, at which time the turbine is taken offline and shut down. By way of example, a gas turbine engine often will be operated to generate power continuously for approximately 4000 hours, after which it is taken off line for routine maintenance, inspection, and repair of any components identified during inspection. Taking a gas turbine off line and eventually shutting it down completely for scheduled maintenance may be a multi-day project. Some turbine components, such as the turbine rotor section, are operated at temperatures, for example, exceeding 1000° C. (1832° F.). The turbine may require 48-72 hours of cooling time to achieve ambient temperature before complete shutdown in order to reduce likelihood of component warping or other deformation. During the shutdown phase the turbine rotor rotational speed is spooled down from operating speed of approximately 3600 RPM to a speed of approximately 120 RPM or less in a "turning gear mode", where the rotor is externally driven by an auxiliary drive motor, in order to reduce likelihood of rotor warping. Other turbine components, such as the turbine housing, are also cooled slowly to ambient temperature.

Once the turbine is cooled to ambient temperature over the course of up to approximately 72 hours, internal components of the now static turbine can be inspected with inspection tools. The inspection tools are inserted into inspection ports located about the turbine periphery and positioned so that the field of view of each inspection tool encompasses an area of interest within the turbine, such as one or more vanes or blades, combustor baskets, etc. The inspection tools capture information of objects of interest within the field of view for remote visualization and analysis by an inspector.

Currently, inspection of gas turbine engines are conducted on site by a human that brings the inspection tools with him/her. In doing so, owners of the engines are responsible for paying for the expenses of the person, wages and potential rental fees of the inspection tools. Additionally, inspections of engines are not achievable if the engines are going to be turned off for only a short period of time. Additionally, with a human conducting the inspection comes to possibility of injury and/or other safety concerns. Additionally, inspection quality and productivity is subject to the inspection process and the manipulation skills of the inspectors.

SUMMARY

Briefly described, aspects of the present invention relate to a method and a system for inspecting a gas turbine and other power generation machinery with inspection tools arranged on a track that is positioned to the gas turbine.

According to a first aspect, a method for inspection of a gas turbine comprises activating an inspection apparatus. The inspection apparatus comprises one or more inspection tools arranged on a track. Each inspection tool comprises an extendible shaft having a proximal end that is attached to the track and a distal end carrying a sensor. The method further comprises operating the inspection apparatus to move the one or more inspection tools to an inspection position. The respective shaft of the one or more inspection tools is extended outward from a retracted position to guide the sensor into a respective inspection port of the gas turbine.

According to a second aspect, a system for inspection of a gas turbine comprises a track, an inspection tool arranged on the track, and a control system. The inspection tool comprises an extendible shaft having a proximal end that is attached to the track and a distal end carrying a sensor. The control system operates the inspection tool to move to an inspection position. The shaft of the inspection tool is extended outward from a refracted position to guide the sensor into a respective inspection port of the gas turbine.

According to a third aspect, an apparatus for inspection of a gas turbine comprises a track and an inspection tool arranged on the track. The inspection tool comprises an extendible shaft with a proximal end attached on the track and a distal end carrying a sensor. The shaft of the inspection tool is extendible outward from a retracted position to guide the sensor into an inspection port of the gas turbine.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings:

FIG. 1 illustrates a schematic diagram of a system inspecting a gas turbine according to an embodiment;

FIG. 2 illustrates a perspective view of an inspection tool for insertion into a combustor section of a gas according to an embodiment;

FIG. 5 illustrates a perspective view of an inspection apparatus for inspecting a combustor section of a gas turbine from a direction facing a main flow;

FIG. 6 illustrates another perspective view of the inspection apparatus illustrated in FIG. 5 from a direction facing away from a main flow;

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

FIG. 1 illustrates a schematic diagram of a system that operates and inspects a gas turbine according to an embodiment. The system may comprise an inspection apparatus 100 housed or arranged locally to the gas turbine and a control system 200, including, for example, a controller for controlling or actuating components of the inspection apparatus 100 during an inspection. The control system 200 may comprises control software for controlling or actuating components of the inspection apparatus 100. The control system 200 may wirelessly transmits signals to an operator interface 300. An operator interface 300 may be provided to enable an operator to monitor and/or control the inspection process. The operator may VNC remote control the inspection apparatus 100 via the operator interface 300. The operator interface 300 includes an I/O interface comprising, for example, a display device such as a monitor and an input device such as a keyboard, mouse, touchpad, among others. In one example, the operator interface 300 may include a computer terminal, such as a PC or a notebook, among others. The operator interface 300 may be located at a remote location with respect to the gas turbine. This would obviate the need for on-site inspection personnel.

According to the illustrated embodiments, the inspection apparatus 100 includes an inspection tool arranged on a track and may be operated to be inserted into internal components of the gas turbine engine during an inspection. The internal components could be located, for example, within a combustor section, a turbine section, a compressor section, or combinations thereof.

Figure 4:
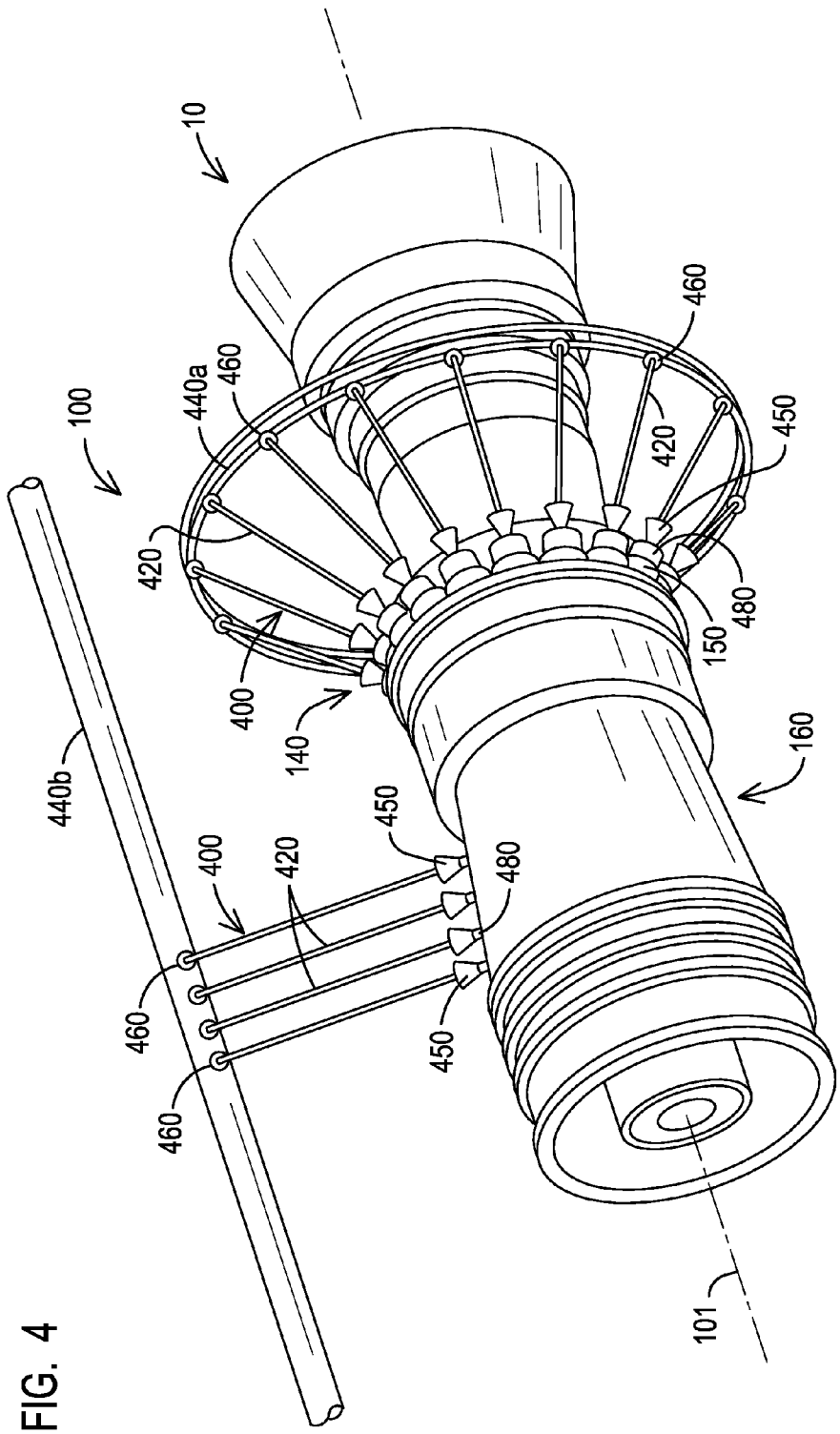
FIG. 4 illustrates a perspective view of an inspection apparatus for inspecting a gas turbine according to an embodiment.

FIG. 4 shows a perspective view of an inspection apparatus 100 in accordance with one embodiment. The inspection apparatus includes one or more inspection tools 400 arranged on a track 440.

According to the embodiment, the inspection tool 400 comprises an extendible shaft 420 with a proximal end attached on the track 440 and a distal end carrying a sensor (not shown). In one embodiment, the proximal end of the extendible shaft 420 may be attached on the track 440 by a wheel 460 to move the inspection tool 400 to an inspection position.

The tracks 440 support the inspection tools on-site of the gas turbine engine 10. The tracks 440 may be structurally configured, for example, to provide a desired accessibility of the inspection tools based on the region of the gas turbine 10 being inspected. In the embodiment shown in FIG. 4, there are two tracks, designated further as a ring track 440a and a rail track 440b. The ring track 440a, which supports the inspection tools for the combustor section 140, is embodied in the shape of a circular ring. In an alternate embodiment, instead of a complete ring, the ring track 440a may constitute an arc of a circle, for example, semicircular. Other shapes such as oval or elliptical may also be considered. The rail track 440b, which supports the inspection tools for the turbine section, is embodied in this example as a flat rail. The tracks 440 may be arranged with a distance with respect to the gas turbine 10 so that the extendible shafts 420 of the inspection tools 400 may extend to access inspection ports 480 of the gas turbine 10.

In the illustrated example, the combustor section 140 comprises a plurality of combustor cans 150, for example twelve in number, arranged circumferentially spaced from each other in a circular arrangement. The ring track 440a is arranged coaxially with respect to the combustor section so that the shafts 420 of the inspection tools 400 are extendable radially inward from the ring track 440a to access the inspection ports 480 of the combustor cans 150. FIG. 5 shows a perspective view of the ring track 440a from a direction facing the main gas flow F. FIG. 6 shows a perspective view of the same arrangement from a direction opposite to the main gas flow F.

FIG. 2 illustrates a perspective view of an inspection tool 400 for insertion into a combustor section 140 of a gas turbine engine 10 according to an embodiment. In the illustrated embodiment, the inspection tool 400 comprises an extendible shaft 420. The shaft 420 is operable to be extended from a retracted position so as to be inserted into a pilot nozzle port 148 during inspection into a combustor can 150 of a combustor section 140. In the shown view, the shaft 420 is in an extended position. The inspection tool 400 comprises a sensor 430 carried at a distal end of the shaft 420. The inspection tool 400 may be configured for translation motion along its central longitudinal axis 410 by way of the extension and retraction of the shaft 420. The tool 400 may also be configured for rotation about its central longitudinal axis 410. According to an embodiment, the inspection tool 400 may comprise a linear drive for translating the inspection tool 400 along its central longitudinal axis 410. A rotational drive may be provided for rotating the inspection tool 400 about its central longitudinal axis 410.

Referring back to FIG. 4, the inspection tool 400 may be controlled, for example, remotely, for insertion into the inspection port 480 to reach an inspection position of a combustor can when the engine is off line for performing an inspection. According to an embodiment, after completing the inspection of one combustor can 150, the inspection tool 400 may be remotely controlled for withdrawing the inspection sensor 430 from the inspection position of that combustor can 150 by retracting the shaft 420. Furthermore, the ring track 440a may be remotely controlled for rotating the inspection tool 400 to another inspection port 480 by the wheel 460 for performing another inspection of another combustor can 150 until a complete inspection of combustor cans 150 of the combustor section 140 is implemented.

According to an embodiment, a plurality of inspection tools 400 may be arranged on the ring track 440a simultaneously. For example, the plurality of inspection tools 400 may carry a plurality of sensors that are identical to each other. The ring track 440a may be remotely controlled for insertion the plurality of identical inspection tools 400 into a plurality of inspection ports 480 to reach a plurality of inspection positions of combustor cans 150 simultaneously. According to the embodiment, the ring track 440a may be remotely controlled for retracting the plurality of identical inspection tools 400 from the plurality of inspection positions of the plurality of combustor cans 150 simultaneously. According to the embodiment, inspections of the plurality of combustor cans 150 may be completed in a proportionally short time period compared to an embodiment that a single inspection tool 400 is arranged on the ring track 440a. For example, a number of N identical inspection tools 400 may be arranged on the ring track 440a. The number of N identical inspection tools 400 may be inserted into N inspection positions of N combustor cans at the same time. A complete inspection of the N inspection positions of the N combustor cans may take place in $1/N^{th}$ of the time compared with a single inspection tool 400 arranged on the ring rack 440a. According to an embodiment, the number of N identical inspection tools 400 may equal to a total number of combustor cans 150 of the combustor section 140. According to the embodiment, the ring track 440a may not need to rotate the identical inspection tools 400 for a complete inspection of all combustor cans 150.

According to an embodiment, a plurality of inspection tools 400 arranged on the ring track 440a may carry a plurality of sensors that are different types from each other. Herein, a plurality of different types of inspections may be implemented respectively at a plurality of inspection positions of the combustor section 140 simultaneously. For example, the different types of sensors may include an optical sensor, a visual sensor, such as a camera, a white light sensor, or a dimensional check sensor.

According to an embodiment, the illustrated inspection tool 400 for inspection of a combustor section 140 of a gas turbine 10 may incorporate a Vision Scope™ tool, manufactured by Siemens Energy, Inc.

According to an embodiment, the ring track 440*a* is arranged at a position that does not interfere with cover lifts of the gas turbine 10.

Figure 7:
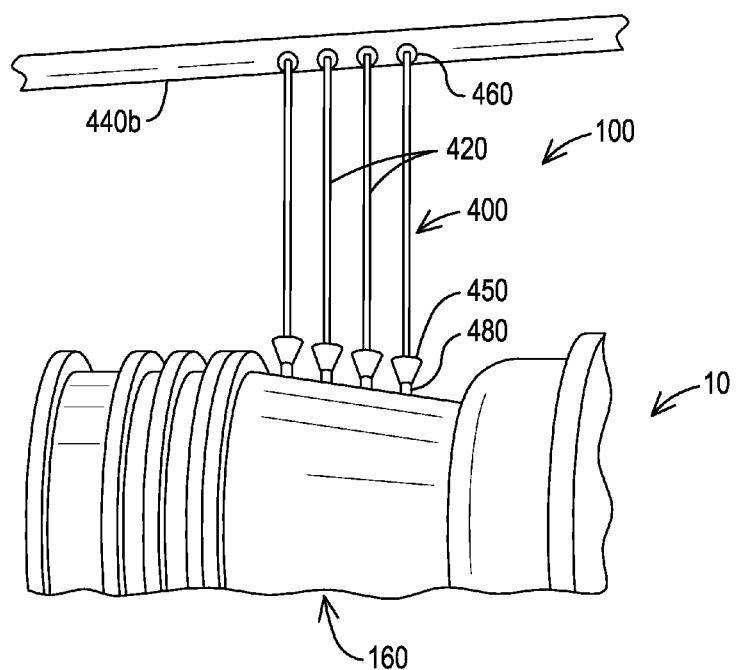
FIG. 7 illustrates a longitudinal perspective view of an inspection apparatus for inspecting a turbine section of a gas turbine according to an embodiment.
Figure 8:
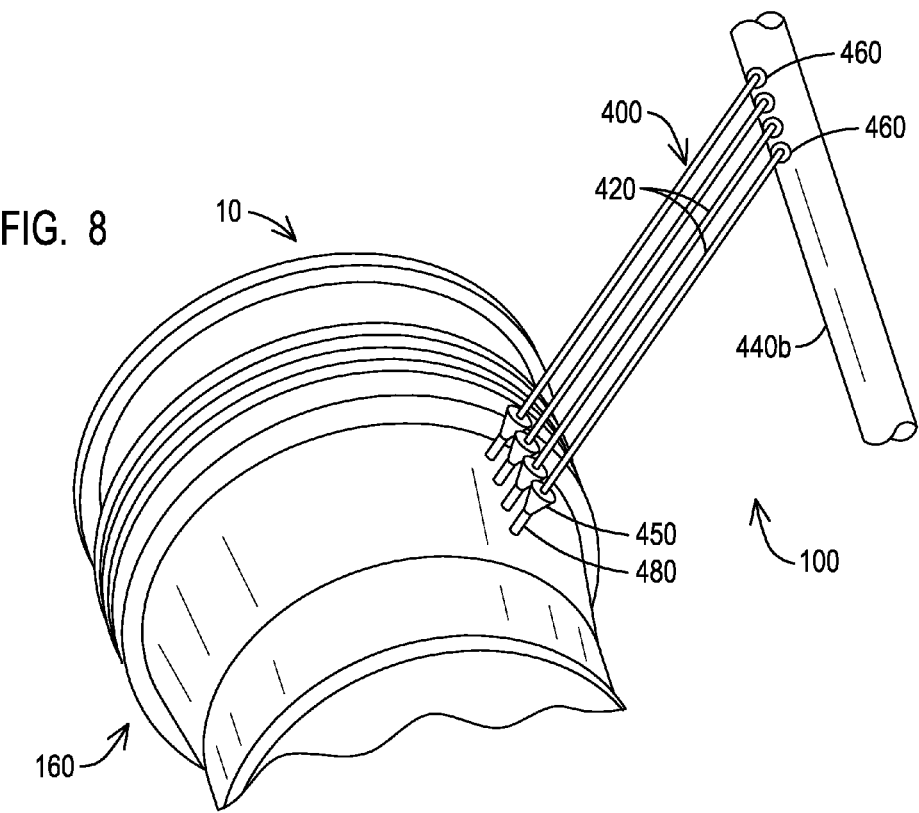
FIG. 8 illustrates a top perspective view of the inspection apparatus illustrated in FIG. 7.

Referring back to FIG. 4, the rail track 440*b*, shown in this example, extends parallel to a central longitudinal axis 101 of a gas turbine 10 of the turbine section 160. The shafts 420 of the inspection tools 400 are extendable from the rail track 440*b* to access the inspection ports 480 of the turbine section 160. FIG. 7 illustrates a longitudinal perspective view of the arrangement of the rail track 440*b*, while FIG. 8 illustrates a top perspective view of the same arrangement.

Figure 3:
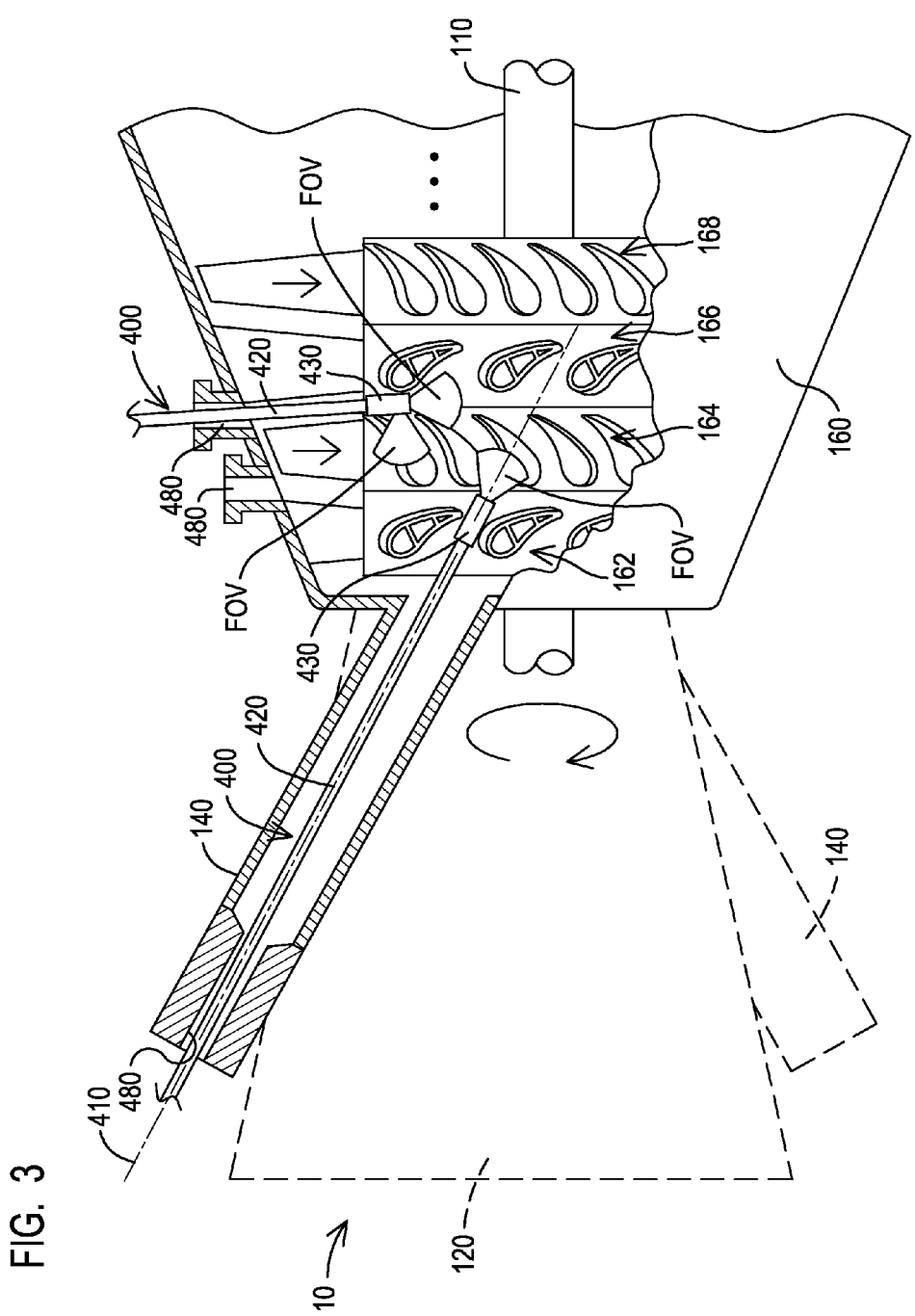
FIG. 3 illustrates a perspective view of an inspection tool for insertion into internal components of a gas turbine according to an embodiment.

FIG. 3 illustrates an embodiment in which inspection tools 400 are provided for insertion into internal components of a turbine section of a gas turbine 10. A plurality of rows of stationary vanes and rotating blades that circumscribe a turbine shaft 110 and ring segments. In the embodiment of FIG. 3, the inspection tool 400 comprises an extendible shaft 420 extending through inspection ports 480 into a gas turbine engine 10 between first and second rows of stationary vanes 162, 166 and first row of rotating blades 164. The inspection tool 400 comprises a sensor 430 carried at a distal end of the shaft 420.

The inspection tool 400 may be configured for translation motion along its central longitudinal axis 410, for example by way of a linear drive. The inspection tool 400 may also be configured rotation about its central axis 410, for example, by way of a rotational drive. The inspection tool 400 may comprise a control system coupled to the linear and the rotational drives and the sensor for positioning the inspection tool 400 and field of view (FOV) along a pre-designated navigation path within the gas turbine 10 to an internal area of interest for performing an inspection without human intervention.

According to an embodiment, the tracks 440*a*/440*b* may be permanently positioned on site with respect to the gas turbine 10. For example, the tracks 440*a*/440*b* may be supported on the ceiling, or on the walls, or on the ground of the gas turbine housing. The tracks 440*a*/440*b* may be supported on any combinations of the ceiling, or the walls, or the ground of the gas turbine housing.

According to the illustrated embodiment, a funnel 450 may optionally be arranged on an inspection port 480 for guiding the inspection tool 400 for insertion into an inspection position. The funnel 450 may be temporarily arranged on the inspection port 480 of the gas turbine 10 by an operator on site prior to inspection. The funnel 450 may be removed from the inspection port 480 after completion of the inspection. A plurality of respective funnels 450 may be arranged at a plurality of respective inspection ports 480. The plurality of respective funnels 450 may guide a plurality of respective inspection tools 400 for insertion through the plurality of respective inspection ports into a plurality of inspection positions.

The extendible shaft 420 of the inspection tool 400 may extend from the rail track 440*b* to access an inspection port 480 of the turbine section 160 of the gas turbine 10. The inspection tool 400 may be controlled, for example, remotely, for insertion into the inspection port 480 of the turbine section 160 to reach an inspection position, for example, between airfoils of stationary vanes. The inspection process of rotating blades may be safely implemented each time when the gas turbine 10 comes down after a shutdown or prior to start up, when the rotor is on turning gear. According to an embodiment, after inspection process of the inspection position of the rotating blades is completed, the inspection tool 400 may be remotely controlled for retracting the shaft 420 from the inspection position of the turbine section 160 so as to withdraw the sensor 430 from the inspection port 480. Furthermore, the rail track 440*b* may be remotely controlled for moving the inspection tool 400 to another inspection port 480 of the turbine section 160 by the wheel 460 for another inspection process.

According to an embodiment, a plurality of inspection tools 400 may be arranged on the rail track 440*b* simultaneously. According to the embodiment, the plurality of inspection tools 400 may carry a plurality of sensors that are identical to each other. The rail track 440*b* may be remotely controlled for insertion the plurality of identical inspection tools 400 into a plurality of inspection ports 480 of the turbine section 160 in radial directions with respect to the turbine section 160 to reach a plurality of inspection positions simultaneously. The plurality of inspection ports 480 of the turbine section 160 may be distributed along a longitudinal direction of the turbine section 160. According to the embodiment, the rail track 440*b* may be remotely controlled for retracting the plurality of identical inspection tools 400 from the plurality of inspection positions of the turbine section 160 simultaneously. According to the embodiment, inspections of the plurality of inspection positions of the turbine section 160 may be implemented in a proportional short time period compared to an embodiment that a single inspection tool 400 is arranged on the rail track 440*b*. For example, a number of N identical inspection tools 400 may be arranged on the rail track 440*b*. The number of N identical inspection tools 400 may be inserted into N inspection ports 480 to inspect N inspection positions of the turbine section 160 at the same time. A complete inspection of the N inspection positions of the rotating blades may occur in $1/N^{th}$ of the time compared with a single inspection tool 400 arranged on the rail track 440*b*. According to an embodiment, the number of N identical inspection tools 400 may equal to a total number of inspection ports 480 of the turbine section 160. According to the embodiment, the rail track 440*b* may not need to move the identical inspection tools 400 for a complete inspection of all the inspection positions of the turbine section 160.

According to an embodiment, a plurality of inspection tools 400 arranged on the rail track 440*b* may carry a plurality of sensors that are different types from each other. According to the embodiment, a plurality of different types of inspections may be implemented respectively at a plurality of inspection positions of the turbine section 160 simultaneously. For example, the different types of sensors may include an optical sensor, a visual sensor, such as a camera, a white light sensor, or a dimensional check sensor.

According to an embodiment, the illustrated inspection tool 400 for inspection of a turbine section 160 of a gas turbine 10 may incorporate a Blade Scope™ tool, manufactured by Siemens Energy, Inc.

According to various embodiments, the sensors 430 may include an optical sensor, a visual sensor, such as a camera, a white light sensor, or a dimensional check sensor, among others. The sensor may include a three dimensional sensor for performing a three dimensional measurements of a combustor section or internal components of a turbine section of a gas turbine engine. A visual sensor may capture visual images of the combustor or the internal components of the gas turbine engine. The visual images may provide information, such as vibration characteristics of the imaged components, the presence of oxidation, etc., to conduct a visual inspection of the imaged components. A dimensional check sensor may provide dimensional information of the turbine engine that is useful for offline engineering studies. For example, the dimensional information may include internal structure information about gas side combustor and transition components within the gas side of a gas turbine that may be used to generate CAD or other computer images.

Figure 9:
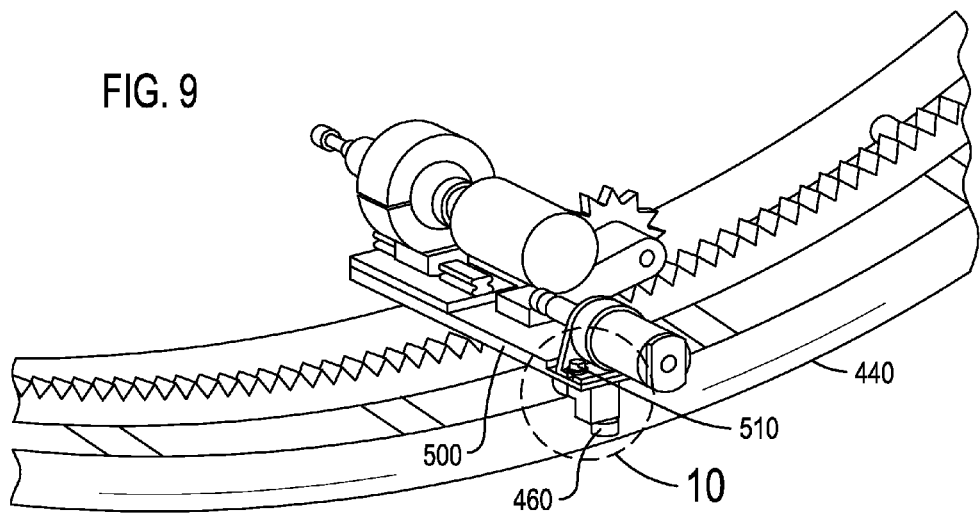
FIG. 9 illustrates a perspective view of a wheel attached to a track according to an embodiment.
Figure 10:
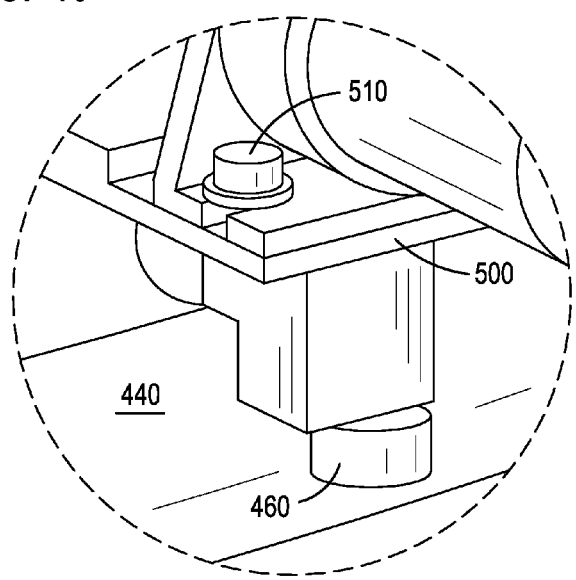
FIG. 10 illustrates an enlarged perspective view of a section in FIG. 9.

FIG. 9 illustrates a perspective views of a wheel 460 attached on a track 440. FIG. 10 is an enlarged perspective view of the dashed section in FIG. 9.

As illustrated in FIG. 9 and FIG. 10, the wheel 460 may be attached to a panel 500 by a screw 510. The panel 500 may be attached on the track 440 by the wheel 460 arranged on side of the track 440. According to an embodiment, the wheel 460 may be manually driven, or may be motor driven. The wheel 460 may be remotely controlled by an inspector offsite for moving an inspection tool to an inspection port along the track 440.

According to an embodiment, the track 440 and the inspection tool 400 may be remotely controlled by software for performing the inspection. Alternatively, the track 440 and the inspection tool 400 may be remotely controlled manually by an inspector if further inspection may be needed for a particular inspection position. For example, if there are 12 of the same parts on a gas turbine engine 10 and only one of the parts is experiencing odd data, such as, hotter than the others, the rack 440 and the inspection tool 400 may be remotely controlled manually by an inspector to inspect that part in further detail.

According to an aspect, the inspection tools may be arranged on the track by wheels and may be contained in a tool box during gas turbine operation. At the inspection time, the wheels may be remotely controlled for moving the inspection tools along the track to inspection ports of the gas turbine for insertion into the inspection ports to reach inspection positions for inspection of the gas turbine. After the inspection is complemented, the wheels may be remotely controlled for moving the inspection tools away from the inspection positions. The inspection tools may be contained in the tool box again for use during next inspection.

The illustrated embodiments may allow for smarter and more efficient inspections of gas turbine engine as well as limited on site human interaction. The inspection tools may be remotely controlled by a control system of the gas turbine engine or by an engineer located offsite. The inspection may be implemented according to operational data of the gas turbine engine acquired from other instrumentation.

According to an aspect, the illustrated embodiments may allow an engine inspection to be implemented in an allotted time period. For example, if the engine is going to be turned off for only an allotted time period, the illustrated embodiments may implement the inspection of the during the allotted time period.

According to an aspect, the inspection may be monitored with over-ride authority from an offsite location. This may allow for the engine to have been inspected and reviewed by an engineer without having to send the engineer on site. This may save the outrage duration and the cost to owners of the engine when an inspection is to take place.

According to an aspect, the illustrated embodiments may allow all engines having the same inspection tools built onto the engines so that the same inspections would be implemented every time for every engine. In contrast, current inspection methods sometimes use different videoscopes depending on the situation. This results in that the same areas are not always inspected the same way.

According to an aspect, the illustrated embodiments may eliminate the "human factor" during an inspection of a gas turbine. The inspection process may be remotely monitored from an offsite location by an engineer so that undesirable inspection process variances based on human skill level differences may be eliminated.

According to an aspect, the inventive techniques provide a robotic inspection method, system and apparatus that are dedicated to turbine engines and may be remotely activated and accessible. Operational anomalies of the data of the turbine engine will determine the priorities of interim inspections. The priorities of interim inspections may be alterable by an engineer.

The illustrated embodiments enable an autonomous engine, such as, autopilot, self-running, etc. The disclosed invention would keep turbine companies at the cutting edge of technology in the gas turbine industry. Going forward in the development of gas turbine, the inventive techniques may influence inspection port locations. The inventive techniques may work together with smart data analysis/acquisition.

The disclosed techniques may alter the inspection process of both of those inspection tools. Further, the disclosed techniques may allow the inspection tools attached on a track that is permanently positioned with respect to the gas turbine. The disclosed techniques may allow the inspection tools remotely controlled by a control system associated with the gas turbine. This is in contrast to current inspection methods that call for an inspector to bring the inspection tools to a gas turbine site and subsequently manually inspect the gas turbine.

The disclosed method, system, and the apparatus may be implemented to other power machinery for performing autonomous inspections.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

LIST OF REFERENCES

10 Gas turbine
101 Central longitudinal axis of a gas turbine

100 Inspection apparatus
110 Turbine shaft
120 Compressor section
140 Combustor section
148 Pilot nozzle port
150 Combustor can
160 Turbine section
162, 166 Row 1 and Row 2 fixed vanes
164, 168 Row 1 and Row 2 rotating blades
200 Control system
300 Operator interface
400 Inspection tool
410 Central longitudinal axis of an inspection tool
420 Inspection tool shaft
430 Sensor
440 Track
440a Ring track
440b Rail track
450 Funnel
460 Wheel
480 Inspection port
500 Panel
510 Screw
FOV Field of view

What is claimed is:

1. A method for inspection of a gas turbine comprising:
activating an inspection apparatus, the inspection apparatus comprising one or more inspection tools arranged on a track, each inspection tool comprising an extendible shaft having a proximal end that is attached to the track and a distal end carrying a sensor; and
operating the inspection apparatus to move the one or more inspection tools to an inspection position, wherein the respective shaft of the one or more inspection tools is extended outward from a retracted position to guide the sensor into a respective inspection port of the gas turbine,
wherein the track comprises a rail track that is positioned parallel with respect to a longitudinal axis of a turbine section of the gas turbine,
wherein the inspection tool arranged on the rail track is controlled by the control system for insertion into the inspection port of the turbine section of the gas turbine with respect to an radial direction of the turbine section,
wherein the track comprises a ring track that is positioned coaxially with respect to a combustion section of the gas turbine, and
wherein the inspection tool arranged on the ring track is controlled by the control system for accessing into the inspection port of the combustion section of the gas turbine with respect to an radial direction of the combustion section.

2. The method as claimed in claim 1, wherein the inspection tool is remotely controlled.

3. The method as claimed in claim 1, further comprising withdrawing the inspection tool from the inspection position by retracting the extendible shaft after completing the inspection.

4. The method as claimed in claim 1, further comprising moving the inspection tool along the track to another inspection port for subsequently inspecting another inspection position of the gas turbine.

5. The method as claimed in claim 1, wherein the inspection tool is moved along the track by a wheel.

6. The method as claimed in claim 5, wherein the wheel is manually driven.

7. The method as claimed in claim 5, wherein the wheel is motor drive and is remotely controlled.

8. The method as claimed in claim 1, wherein a plurality of inspection tools are arranged on the track, and wherein the plurality of inspection tools are inserted into a plurality of inspection ports to reach a plurality of inspection positions simultaneously.

9. The method as claimed in claim 8, wherein the plurality of inspection tools comprise a plurality of identical sensors.

10. The method as claimed in claim 8, wherein the plurality of inspection tools comprise a plurality of different types of sensors.

11. The method as claimed in claim 1, wherein the sensor comprises an optical sensor, a visual sensor, a white light sensor, or a dimensional check sensor.

12. The method as claimed in claim 1, wherein the inspection tool is remotely controlled by a control system.

13. The method as claimed in claim 1, further comprising performing further inspection for an inspection position if inspection data of said inspection position is different than inspection data of other same inspection positions, wherein the inspection tool is remotely controlled by an inspector for the further inspection.

14. The method as claimed in claim 1, wherein the inspection tool is guided by a funnel arranged on the inspection port.

15. The method as claimed in claim 1, wherein the track is permanently positioned on site with respect to the gas turbine.

16. A system for inspection of a gas turbine comprising:
a track;
an inspection tool arranged on the track, wherein the inspection tool comprises an extendible shaft with a proximal end attached to the track and a distal end carrying a sensor; and
a control system for operating the inspection tool to move the inspection tool to an inspection position, wherein the shaft of the inspection tool is extended outward from a retracted position to guide the sensor into an inspection port of the gas turbine,
wherein the track comprises a rail track that is positioned parallel with respect to a longitudinal axis of a turbine section of the gas turbine,
wherein the inspection tool arranged on the rail track is controlled by the control system for insertion into the inspection port of the turbine section of the gas turbine with respect to an radial direction of the turbine section,
wherein the track comprises a ring track that is positioned coaxially with respect to a combustion section of the gas turbine, and
wherein the inspection tool arranged on the ring track is controlled by the control system for accessing into the inspection port of the combustion section of the gas turbine with respect to an radial direction of the combustion section.

17. The system as claimed in claim 16, wherein the inspection tool is moved along the track by a wheel, and wherein the wheel is motor driven and is remotely controlled by the control system.

18. An apparatus for inspection of a gas turbine comprising:
a track; and
an inspection tool arranged on the track,
wherein the inspection tool comprises an extendible shaft with a proximal end attached on the track and a distal end carrying a sensor, and wherein the shaft of the inspection tool is extendible outward from a retracted position to guide the sensor into an inspection port of the gas turbine, wherein the track comprises a rail track that is positioned parallel with respect to a longitudinal axis of a turbine section of the gas turbine, wherein the inspection tool arranged on the rail track is controlled by the control system for insertion into the inspection port of the turbine section of the gas turbine with respect to an radial direction of the turbine section, wherein the track comprises a ring track that is positioned coaxially with respect to a combustion section of the gas turbine, and wherein the inspection tool arranged on the ring track is controlled by the control system for accessing into the inspection port of the combustion section of the gas turbine with respect to an radial direction of the combustion section.

* * * * *